(12) United States Patent
Pust et al.

(10) Patent No.: US 11,429,409 B2
(45) Date of Patent: Aug. 30, 2022

(54) SOFTWARE EMULATOR FOR HARDWARE COMPONENTS IN A GAS DELIVERY SYSTEM OF SUBSTRATE PROCESSING SYSTEM

(71) Applicant: LAM RESEARCH CORPORATION, Fremont, CA (US)

(72) Inventors: Bostjan Pust, San Ramon, CA (US); Tom Trinh, Dublin, CA (US); Chung-Ho Huang, San Jose, CA (US)

(73) Assignee: Lam Research Corporation, Fremont, CA (US)

( * ) Notice: Subject to any disclaimer, the term of this patent is extended or adjusted under 35 U.S.C. 154(b) by 567 days.

(21) Appl. No.: 16/120,846

(22) Filed: Sep. 4, 2018

(65) Prior Publication Data
US 2020/0073685 A1 Mar. 5, 2020

(51) Int. Cl.
*G06F 9/455* (2018.01)

(52) U.S. Cl.
CPC ................. *G06F 9/45508* (2013.01)

(58) Field of Classification Search
CPC .... G06F 9/45508; G06F 9/455; G06F 11/261; G06F 11/3476; G05B 19/0428; H01L 21/67017; H01L 21/67276
See application file for complete search history.

(56) References Cited

U.S. PATENT DOCUMENTS

| | | | | |
|---|---|---|---|---|
| 6,622,286 | B1 * | 9/2003 | Ngo | G05B 19/0421 700/121 |
| 6,802,045 | B1 * | 10/2004 | Sonderman | G05B 19/41885 716/106 |
| 7,640,078 | B2 * | 12/2009 | Smirnov | G05D 7/0635 700/282 |

(Continued)

FOREIGN PATENT DOCUMENTS

| | | | |
|---|---|---|---|
| CN | 108444874 A | | 8/2018 |
| JP | 3984868 B2 | | 10/2007 |
| KR | 10-1853361 | * | 4/2018 ............. G06F 17/50 |

OTHER PUBLICATIONS

Tanev et al. "A Correct-by-Construction Design and Programming Approach for Open Paper-Based Digital Microfluidics" 2017 Symposium on Design, Test, Integration and Packaging of MEMS and MOEMS [retrieved on Dec. 10, 2020]. (Year: 2017).*

(Continued)

*Primary Examiner* — Rehana Perveen
*Assistant Examiner* — Alfred H B Wechselberger

(57) ABSTRACT

A software emulation system for a gas delivery system of a substrate processing system includes an input/output bus and an emulator bus. An input/output bus adapter includes a switch configured to route data packets from a system controller for the substrate processing system to one of the input/output bus and the emulator bus. A gas delivery system emulator in communication with the emulator bus is configured to receive the data packets from the input/output bus (Continued)

adapter via the emulator bus and perform software-based emulation of a plurality of hardware components of the gas delivery system that are interconnected. The plurality of hardware components are modelled using one or more software models and include a gas source and at least one of a valve and a mass flow controller.

26 Claims, 7 Drawing Sheets

(56) References Cited

U.S. PATENT DOCUMENTS

| | | | |
|---|---|---|---|
| 2002/0161559 A1* | 10/2002 | Tariq | G05B 11/42 702/190 |
| 2006/0052904 A1* | 3/2006 | Brodeur | G01F 1/363 700/121 |
| 2006/0136075 A1* | 6/2006 | Sun | G05B 13/024 700/42 |
| 2006/0163216 A1* | 7/2006 | Brandt | H05H 1/34 219/121.39 |
| 2008/0031085 A1* | 2/2008 | McLaughlin | B01F 15/042 366/162.1 |
| 2008/0312757 A9* | 12/2008 | Nixon | G05B 19/042 700/83 |
| 2009/0312876 A1* | 12/2009 | Yoneda | G05D 7/0635 700/282 |
| 2009/0326903 A1* | 12/2009 | Ludwig | B01L 3/502707 703/16 |
| 2011/0231174 A1 | 9/2011 | Kusaka et al. | |
| 2012/0323350 A1* | 12/2012 | Yamamoto | G05B 11/42 700/97 |
| 2013/0146148 A1* | 6/2013 | Smirnov | F17D 1/16 137/13 |
| 2014/0236556 A1 | 8/2014 | Yamamoto et al. | |
| 2014/0343918 A1* | 11/2014 | Grgic | G05B 19/042 703/23 |
| 2016/0216713 A1* | 7/2016 | Mudd | F16K 37/005 |
| 2017/0194172 A1* | 7/2017 | Mudd | H01J 37/3244 |
| 2018/0120864 A1* | 5/2018 | El-Shaer | G05B 17/02 |
| 2018/0121590 A1* | 5/2018 | Brisk | G06F 30/392 |
| 2018/0320504 A1* | 11/2018 | Gunnerud | E21B 41/00 |
| 2020/0012265 A1* | 1/2020 | Thomsen | G06F 3/0482 |
| 2020/0033896 A1* | 1/2020 | Tseng | G05D 7/0647 |

OTHER PUBLICATIONS

Minhass et al. "Scheduling and Fluid Routing for Flow-Based Microfluidic Laboratories-on-a-Chip" IEEE Transactions on Computer-Aided Design of Integrated Circuits and System, vol. 37, No. 3 (Mar. 2018) [retrieved on Dec. 9, 2020] (Year: 2018).*

Wang et al. "Composable Behavioral Models and Schematic-Based Simulation of Electrokinetic Lab-on-a-Chip Systems" IEEE Transactions on Computer-Aided Design of Integrated Circuits and Systems, vol. 25, No. 2 [retrieved on Nov. 12, 2020] (Year: 2006).*

Lynn, S. "Virtual Metrology for Plasma Etch Processes" [Thesis] Faculty of Science and Engineering, Electronic Engineering Department, National University of Ireland, Maynooth [retrieved on Nov. 13, 2020] (Year: 2011).*

Ender, F. "Modeling, Realization and Characterization of Microreactors in Lab-on-a-Chip Devices" [Thesis] Department of Electron Devices, Budapest University of Technology and Economics [retrieved on Dec. 11, 2020] (Year: 2016).*

Zhang et al. "Microelectrofluidic Systems: Modeling and Simulation" Chapter 4, CRC Press, ISBN: 0-8493-1276-0 [retrieved on Dec. 10, 2020] (Year: 2002).*

International Search Report and Written Opinion for PCT/US2019/049055 dated Dec. 19, 2019; 9 pages.

* cited by examiner

SOFTWARE EMULATOR FOR HARDWARE COMPONENTS IN A GAS DELIVERY SYSTEM OF SUBSTRATE PROCESSING SYSTEM

FIELD

The present disclosure relates to substrate processing systems, and more particularly to a software emulator for hardware components in a gas delivery system of a substrate processing system.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Substrate processing systems may be used to perform etching, deposition, and/or other treatment of substrates such as semiconductor wafers. Example processes that may be performed on a substrate include, but are not limited to, chemical vapor deposition (CVD), plasma enhanced chemical vapor deposition (PECVD), atomic layer deposition (ALD), atomic layer etch (ALE), plasma enhanced atomic layer deposition (PEALD) and/or other etch, deposition, and cleaning processes.

During processing, a substrate is arranged on a substrate support, such as a pedestal, an electrostatic chuck (ESC), etc. in a processing chamber of the substrate processing system. One or more gas mixtures are introduced into the processing chamber by a gas delivery system to treat the substrate. A gas delivery system including gas sources, gas lines, valves and mass flow controllers (MFCs) may be used to supply gas mixtures to one or more processing chambers. Plasma may be struck during processing to enhance chemical reactions within the processing chamber. An RF bias may also be supplied to the substrate support to control ion energy.

When developing a particular recipe and/or hardware configuration, the substrate processing system and the gas delivery system need to be tested to ensure operation as intended. Furthermore, a system controller should be able to diagnose some of the faults that occur based on sensed parameters such as flowrates, temperatures and/or pressures.

SUMMARY

A software emulation system for a gas delivery system of a substrate processing system includes an input/output bus and an emulator bus. An input/output bus adapter includes a switch configured to route data packets from a system controller for the substrate processing system to one of the input/output bus and the emulator bus. A gas delivery system emulator in communication with the emulator bus is configured to receive the data packets from the input/output bus adapter via the emulator bus and perform software-based emulation of a plurality of hardware components of the gas delivery system that are interconnected. The plurality of hardware components are modelled using one or more software models and include a gas source and at least one of a valve and a mass flow controller.

In other features, the gas delivery system emulator includes a gas simulation engine to perform emulation using one or more software models, configuration data defining the plurality of hardware components and a netlist defining connections between the plurality of hardware components.

In other features, the gas delivery system emulator includes a gas simulation engine manager to manage the gas simulation engine. The gas simulation engine manager interfaces with a process control application of the system controller and generates the configuration data and the netlist. The gas simulation engine selectively generates a test log file.

In other features, emulation performed by the gas delivery system emulator is performed without altering operation or coding of the system controller.

In still other features, at least one of the one or more software models includes a mass flow controller model to simulate a mass flow controller and to select one of a plurality of output functions based on a comparison of an output flow rate and a flow rate setpoint. The mass flow controller model uses a first function when the output flow rate is within a predetermined range around the flow rate setpoint, a second function when the output flow rate is less than the predetermined range and a third function when the output flow rate is greater than the predetermined range.

In other features, the mass flow controller model includes a noise generator to selectively add noise when the first function is operative.

In other features, at least one of the one or more software modules includes a normal emulation mode and at least one failure emulation mode.

A method for testing a gas delivery system of a substrate processing system includes routing data packets received from a system controller for the substrate processing system to one of an input/output bus and an emulator bus; receiving the data packets from the emulator bus and performing software-based emulation of a plurality of hardware components of the gas delivery system that are interconnected; and modelling the plurality of hardware components using one or more software models. The plurality of hardware components include a gas source and at least one of a valve and a mass flow controller.

In other features, the method includes performing emulation based on the one or more software models, configuration data defining the plurality of hardware components and a netlist defining connections between the plurality of hardware components. The method includes interfacing with a process control application of the system controller to generate the configuration data and the netlist. The method includes selectively generating a test log file.

In other features, the method includes performing the emulation without altering operation or coding of the system controller. At least one of the one or more software models includes a mass flow controller model to simulate a hardware mass flow controller and to select one of a plurality of output functions based on a comparison of an output flow rate and a flow rate setpoint.

In other features, the method includes using a first function when the output flow rate is within a predetermined range around the flow rate setpoint, a second function when the output flow rate is below the predetermined range, and a third function when the output flow rate is greater than the predetermined range.

In other features, the method includes using a noise generator to selectively add noise when the first function is operative. At least one of the one or more software modules includes a normal emulation mode and at least one failure emulation mode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
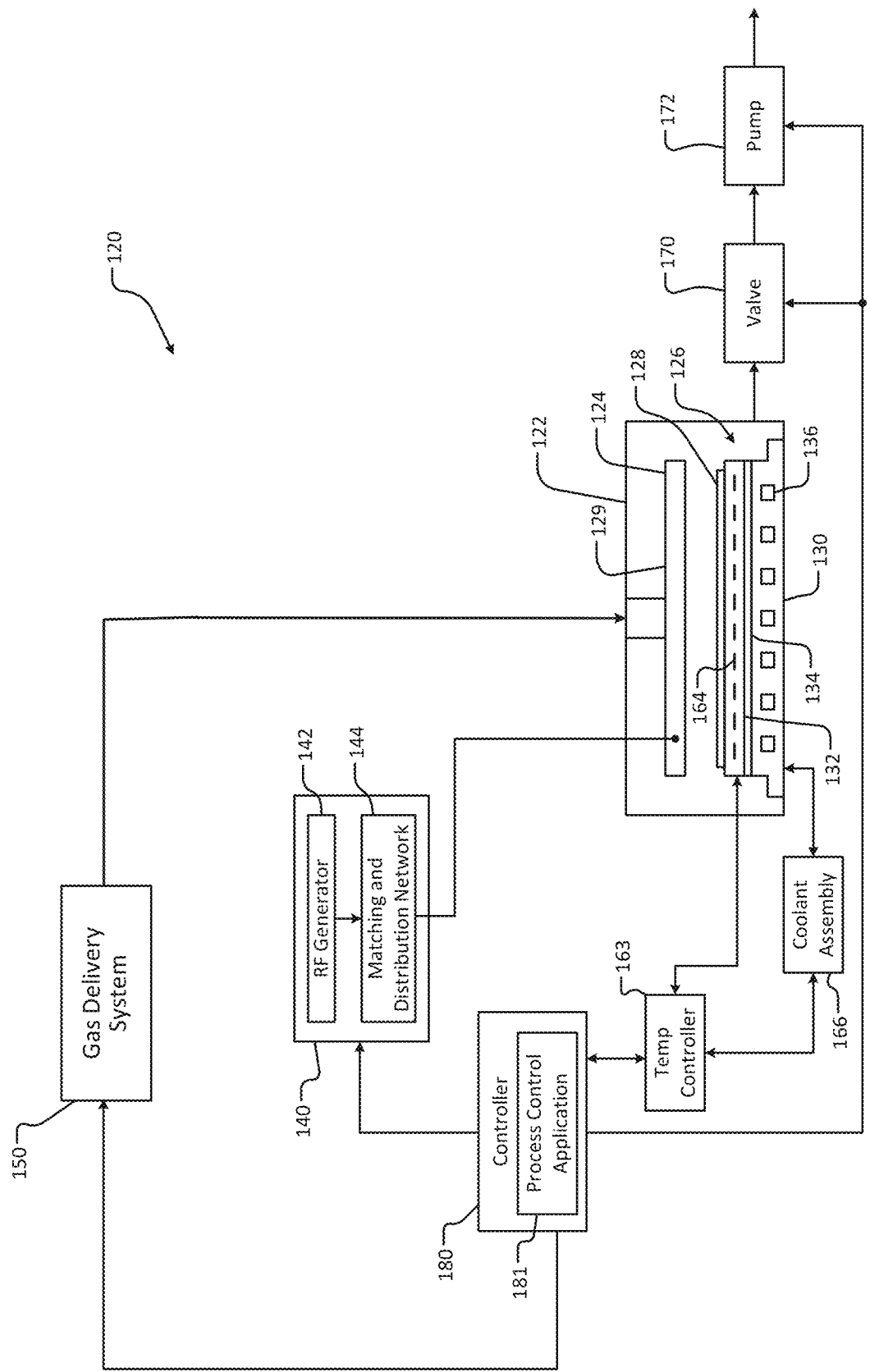
FIG. 1 is a functional block diagram of an example of a substrate processing system according to the present disclosure.

A system controller executes a process control application that is configured based on a topology of the gas delivery system, the processing chamber and a recipe. The recipe defines operating parameters such as the timing of delivery of one or more gases in one or more gas mixtures, valve control timing, RF power timing, and RF bias timing; the power levels supplied to the heaters, the RF power source, and the RF bias source; the flow rates, etc.

The system controller receives feedback values from one or more sensors and controls one or more actuators. Examples of actuators include mass flow controllers, valves, resistive heaters, the RF bias source, the RF power source, and/or other actuators. Examples of sensors include temperature sensors, pressure sensors, flow sensors, etc. The system controller follows the recipe and makes adjustments to the actuators based on the feedback from the sensors. When a new process is being developed, extensive testing of the hardware components is performed before production processing of substrates is initiated. The testing is typically costly and time consuming.

Some control applications include limited software simulation functions to facilitate testing. The software simulation functions attempt to simulate some of the connected hardware components. However, the software simulation is typically able to execute only a very small portion of code in the process control application. To perform limited software simulation, a user returns an affirmative response or "OK" to a calling function and/or sets a flag. However, timing and latency is usually different than the actual process. Furthermore, testing of hardware fault scenarios is not possible. Therefore, this approach is not ideal.

In addition, this approach typically tests only upper software layers of the control application and does not typically test software drivers or other functions found in the lower software layers. Other systems rely on playing back previously-recorded responses from one or more hardware components to simulate operation of the components and to test the process control application.

Systems and methods according to the present disclosure include a software emulator to emulate interconnected hardware components of a gas delivery system of a substrate processing system. The control application for the gas delivery system executes in the same way that it otherwise executes during normal operation. Each of the software modules of the software emulator emulates a given hardware component such as a valve, a mass flow controller, a gas line, or other hardware component.

During setup, the software emulator interfaces with the control application to automatically generate a configuration file including hardware component information (such as name, type, location, and emulated parameter(s)) and a netlist defining interconnection of the emulated hardware components (corresponding to the connections of the hardware components). The configuration file, the netlist and the simulation models are used to emulate normal behavior, worst case behavior and/or fault behavior.

Figure 2:
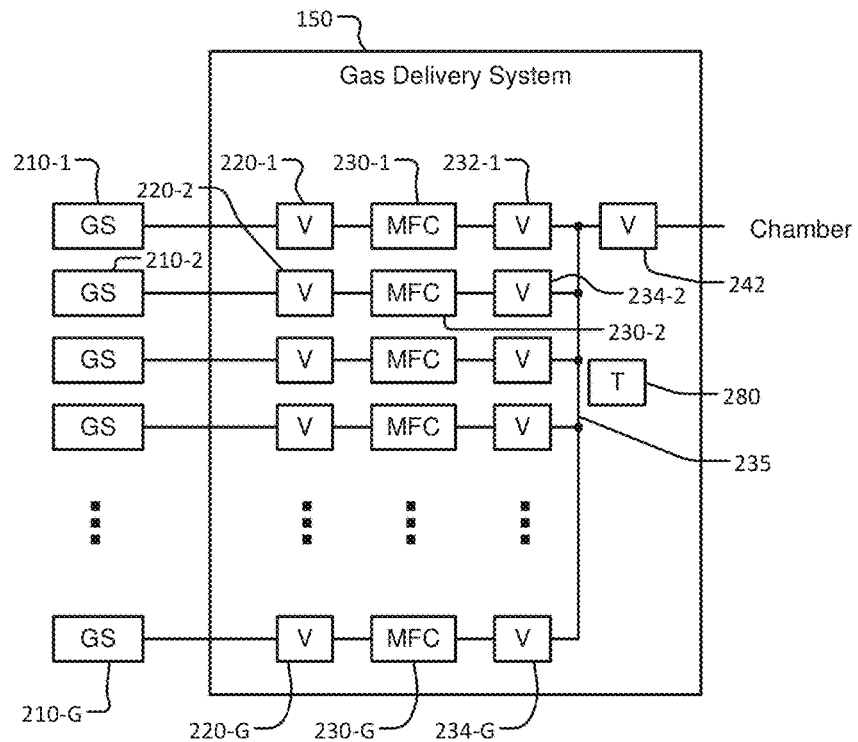
FIG. 2 is a functional block diagram of an example of a gas delivery system for the substrate processing system of FIG. 1.

For purposes of illustration, an example substrate processing system and gas box are presented in FIGS. 1 and 2 for discussion purposes. As can be appreciated, the software emulator described herein can be used for other substrate processing systems and/or gas delivery systems.

Referring now to FIG. 1, an example substrate processing system 120 is shown. While an example of a processing chamber using capacitively-coupled plasma (CCP) is shown, the emulator described herein can be used in other types of substrate processing systems. For example, the emulator described herein can be used in substrate processing systems without plasma, with remote plasma or with inductively coupled plasma (ICP). Additionally, the systems and methods described herein can be used in any other gas delivery system or fluid delivery systems.

The substrate processing system 120 includes a processing chamber 122 that encloses other components of the substrate processing system 120 and contains the RF plasma (if used). The substrate processing system 120 includes an upper electrode 124 and a substrate support 126 such as an electrostatic chuck (ESC). During operation, a substrate 128 is arranged on the substrate support 126.

For example only, the upper electrode 124 may include a gas distribution device 129 such as a showerhead that introduces and distributes process gases. The gas distribution device 129 may include a stem portion including one end connected to a top surface of the processing chamber. A base portion is generally cylindrical and extends radially outwardly from an opposite end of the stem portion at a location that is spaced from the top surface of the processing chamber. A substrate-facing surface or faceplate of the base portion of the showerhead includes a plurality of holes through which precursor, reactants, etch gases, inert gases, carrier gases, other process gases or purge gas flows. Alternately, the upper electrode 124 may include a conducting plate and the process gases may be introduced in another manner.

The substrate support 126 includes a baseplate 130 that acts as a lower electrode. The baseplate 130 supports a heating plate 132, which may correspond to a ceramic multi-zone heating plate. A thermal resistance layer 134 may be arranged between the heating plate 132 and the baseplate 130. The baseplate 130 may include one or more channels 136 for flowing coolant through the baseplate 130.

If plasma is used, an RF generating system 140 generates and outputs an RF voltage to one of the upper electrode 124 and the lower electrode (e.g., the baseplate 130 of the substrate support 126). The other one of the upper electrode 124 and the baseplate 130 may be DC grounded, AC grounded or floating. For example only, the RF generating system 140 may include an RF generator 142 that generates RF power that is fed by a matching and distribution network 144 to the upper electrode 124 or the baseplate 130. In other examples, the plasma may be generated inductively or remotely.

A gas delivery system 150 includes a gas box, gas tubes, valves, mass flow controllers, etc. that deliver one or more gas mixtures such as process gas mixtures, plasma gas mixtures, purge gas, etc. during operation. While a single gas delivery system 150 is shown, two or more gas delivery systems can be used.

A temperature controller 163 may be connected to a plurality of thermal control elements (TCEs) 164 arranged in the heating plate 132. The temperature controller 163 may be used to control the plurality of TCEs 164 to control a temperature of the substrate support 126 and the substrate 128. The temperature controller 163 may communicate with a coolant assembly 166 to control coolant flow through the channels 136. For example, the coolant assembly 166 may include a coolant pump, a reservoir and/or one or more temperature sensors. The temperature controller 163 operates the coolant assembly 166 to selectively flow the coolant through the channels 136 to cool the substrate support 126. A valve 170 and pump 172 may be used to evacuate reactants from the processing chamber 122. A system controller 180 may be used to control components of the substrate processing system 120. The system controller 180 runs a process control application 181.

Referring now to FIG. 2, a portion of the gas delivery system 150 or gas box is shown. Gas sources 210-1, 210-2, . . . , and 210-G (collectively gas sources 210) are connected to flow control devices including primary valves 220-1, 220-2, . . . , and 220-G (where G is an integer greater than 1) (collectively primary valves 220), mass flow controllers (MFC) 230-1, 230-2, . . . 230-G (collectively MFC 230), and secondary valves 232-1, 232-2, . . . , and 232-G (collectively secondary valves 232). Outputs of the secondary valves 234 are connected to a mixing manifold 235 and are input to a valve 242. The valve 242 is associated with gas flowing in the gas lines to the processing chamber associated with the gas delivery system 150.

Figure 3A:
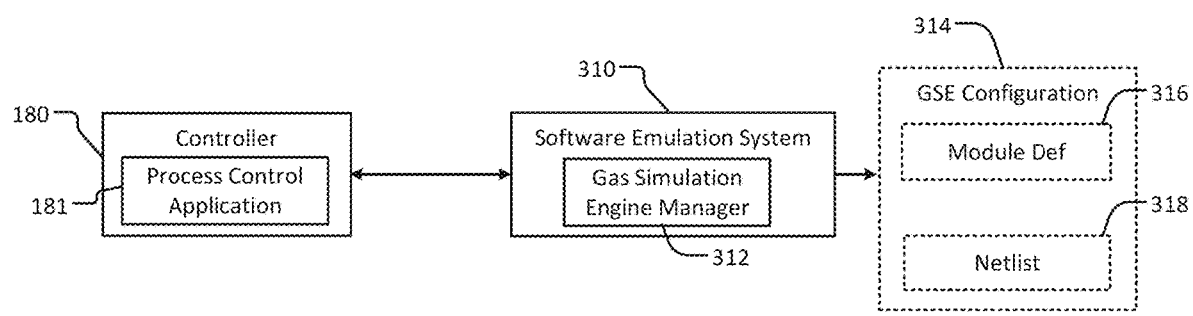
FIG. 3A is a functional block diagram of a software emulation system generating a configuration file including a list of hardware component definitions and a netlist of hardware component connections according to the present disclosure.

Referring now to FIG. 3A, a software emulation system 310 includes a gas simulation engine (GSE) manager 312 that communicates with the process control application 181 in the system controller 180 and generates GSE configuration files 314. The GSE configuration file 314 for a given hardware setup includes a list 316 of software module definitions for each hardware component defining name, type, output or input, position, and emulation parameter. Each software module may be defined by one or more lines in the list (e.g. see MFC15 below). A partial example list of module definitions is set forth in Table 1 below:

TABLE 1

| Name | Model Type | In/Out | Location | Param |
|---|---|---|---|---|
| V1 | Valve | OUT | 0 | SetPt |
| . . . | . . . | . . . | . . . | . . . |
| MFC15 | MFC | OUT | 4 | SetPt |
| MFC15 | MFC | IN | 8 | Flow |
| MFC15 | MFC | IN | 12 | Pressure |
| MFC15 | MFC | IN | 16 | Temp |
| MFC15 | MFC | IN | 20 | Voltage Current |
| MFC15 | MFC | IN | 16 | Temp |
| PSH3 | PSH | IN | 0 | PLimit |
| . . . | . . . | . . . | . . . | . . . |

The GSE configuration files 314 also includes a netlist defining connections of the software modules. A partial example netlist is set forth in Table 2 below:

TABLE 2

| Model Type | Name | Out |
|---|---|---|
| GSrc | G1 | V10 |
| Valve | V10 | MFC1 |
| MFC | MFC1 | V12 |
| Valve | V12 | PSH3 |
| . . . | . . . | . . . |
| GSrc | G2 | V20 |
| Valve | V20 | MFC2 |
| Valve | V22 | PSH3 |
| . . . | . . . | . . . |

As will be described further below, each of the software module types includes a model defining its hardware part behavior. Some of the software module types will also define one or more worst case behaviors and/or failure modes. Once the software module definitions and netlist are generated, the testing can be initiated.

The emulated components are defined by nodes and one or more node classes. Each type of node can have a simulation model class that defines hardware module (MFC, Valve, sensors, etc.) behavior. The netlist defines the topology and includes information about neighbors and multiplicity (e.g. pipelines). Pipelines can have simulation class defined that describes behavior of the pipe hardware (flow resistance, etc.) well.

Figure 3B:
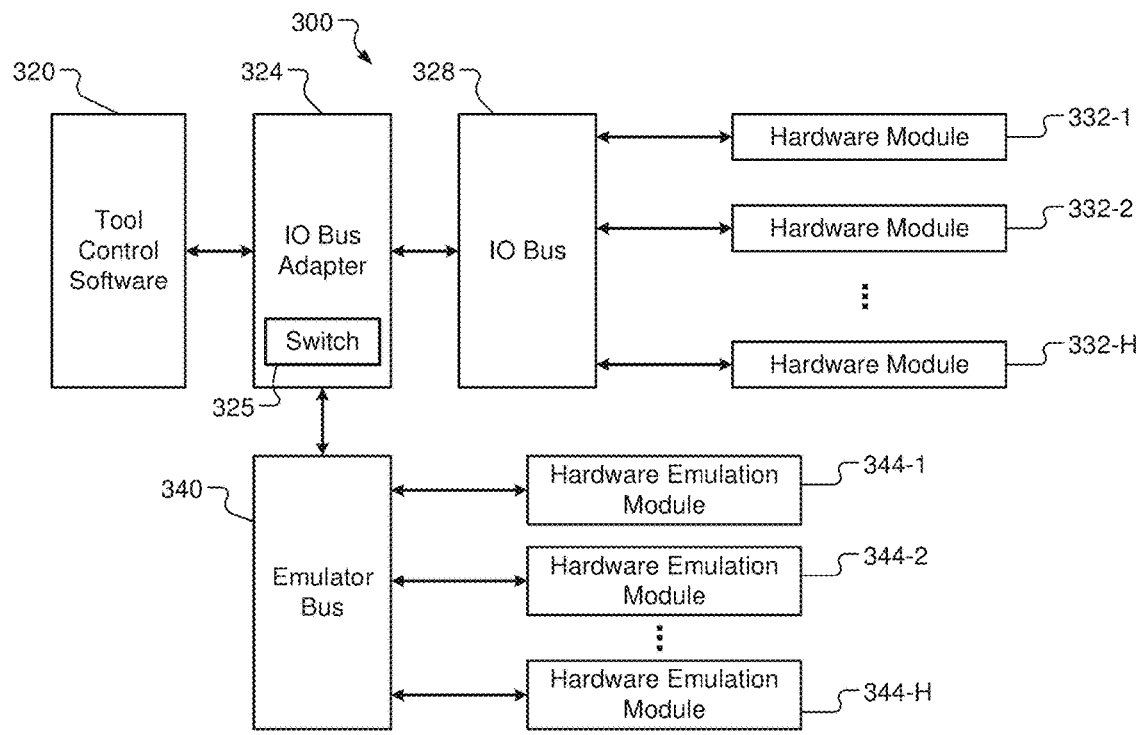
FIG. 3B is a functional block diagram of an example of a software-based emulator for hardware components of a gas delivery system.

Referring now to FIG. 3B, an example of the software emulation system 300 for hardware components of a substrate processing system is shown in further detail. The software emulation system 300 includes tool control software 320 that communicates with an input/output (I/O) bus adapter 324. The I/O bus adapter 324 includes an emulator extension or software switch 325. The software switch 325 routes data packets differently depending on whether the data packet is for a hardware component or the software module (otherwise the data packets are the same). The I/O bus adapter 324 transmits and receives data packets via an I/O bus 328. The I/O bus 328 is also connected to one or more hardware components 332-1, 332-2, . . . , and 332-H (collectively hardware components 332).

The I/O bus adapter 324 transmits and receives data packets via an emulator bus 340. The emulator bus 340 communicates with one or more software-based hardware emulation modules 344-1, 344-2, . . . , and 344-H (collectively hardware emulation modules 344). The software-based hardware emulation modules 344 include models that emulate hardware components such as valves, mass flow controllers, gas delivery system, gas lines, etc. Responses of each model are a function of inputs, time, flow rate, pressure, and/or other physics variables. Responses of the emulator are also a function of all interconnected models in the emulator. In some examples, a default or normal mode of the models is "best case", which is identical to good functional hardware component. By changing model attributes, different fault cases can be emulated.

The I/O bus adapter 324 routes data packets for the software modules to the emulator bus 340. Other data packets are routed to the I/O bus 328. Routing information at this layer simplifies integration to different I/O bus types. Basic principles of interconnected components are interdependent and software modeling of those components on a physics level is applied to different hardware components.

Figure 4:
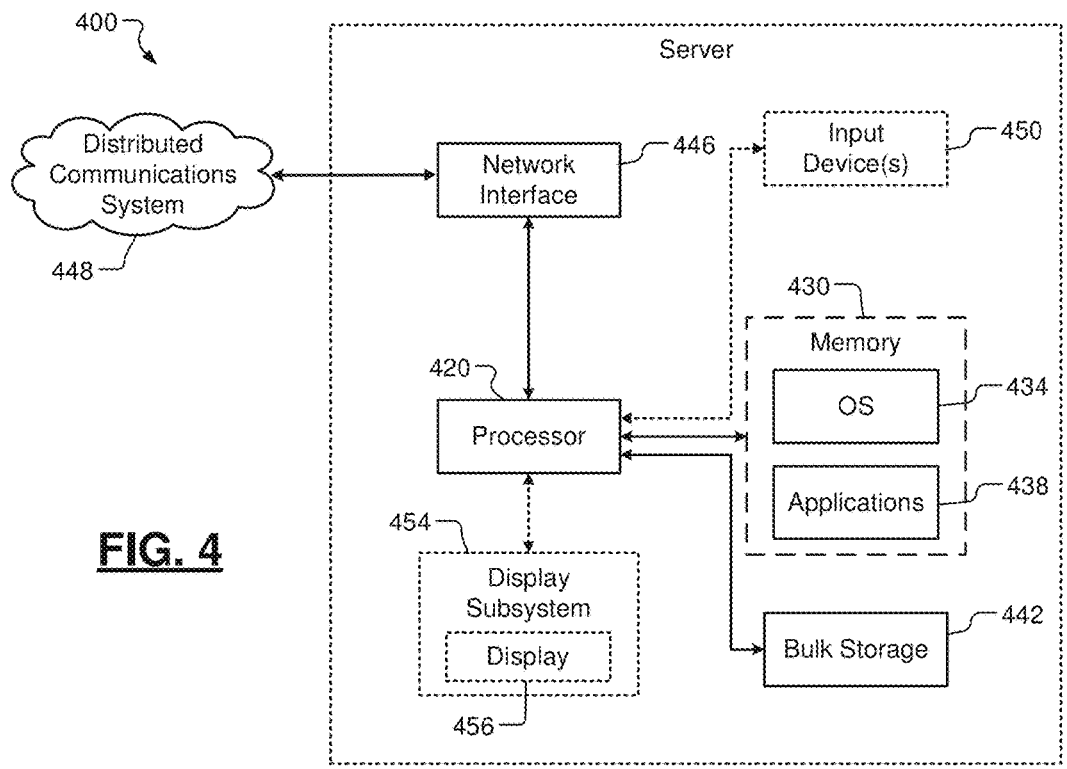
FIG. 4 is a functional block diagram of an example of a server according to the present disclosure.

The system controller and/or the emulation system can be run on a common server or one or more different servers. Referring now to FIG. 4, an example of a server 400 according to the present disclosure is shown. The server 400 includes one or more processors 420 and memory 430. The memory 430 stores an operating system 434 and one or more applications 438. The applications 438 include the process control application and/or the emulation system.

The server 400 further includes bulk storage 442 such as one or more hard disk drives or other bulk memory. The server 400 includes a network interface 446 that communicates via a distributed communication system 448 such as a local or wide area network, the Internet, etc. with other devices. The server 400 may include one or more input devices 450 and a display system 454 including a display 456.

Figure 5:
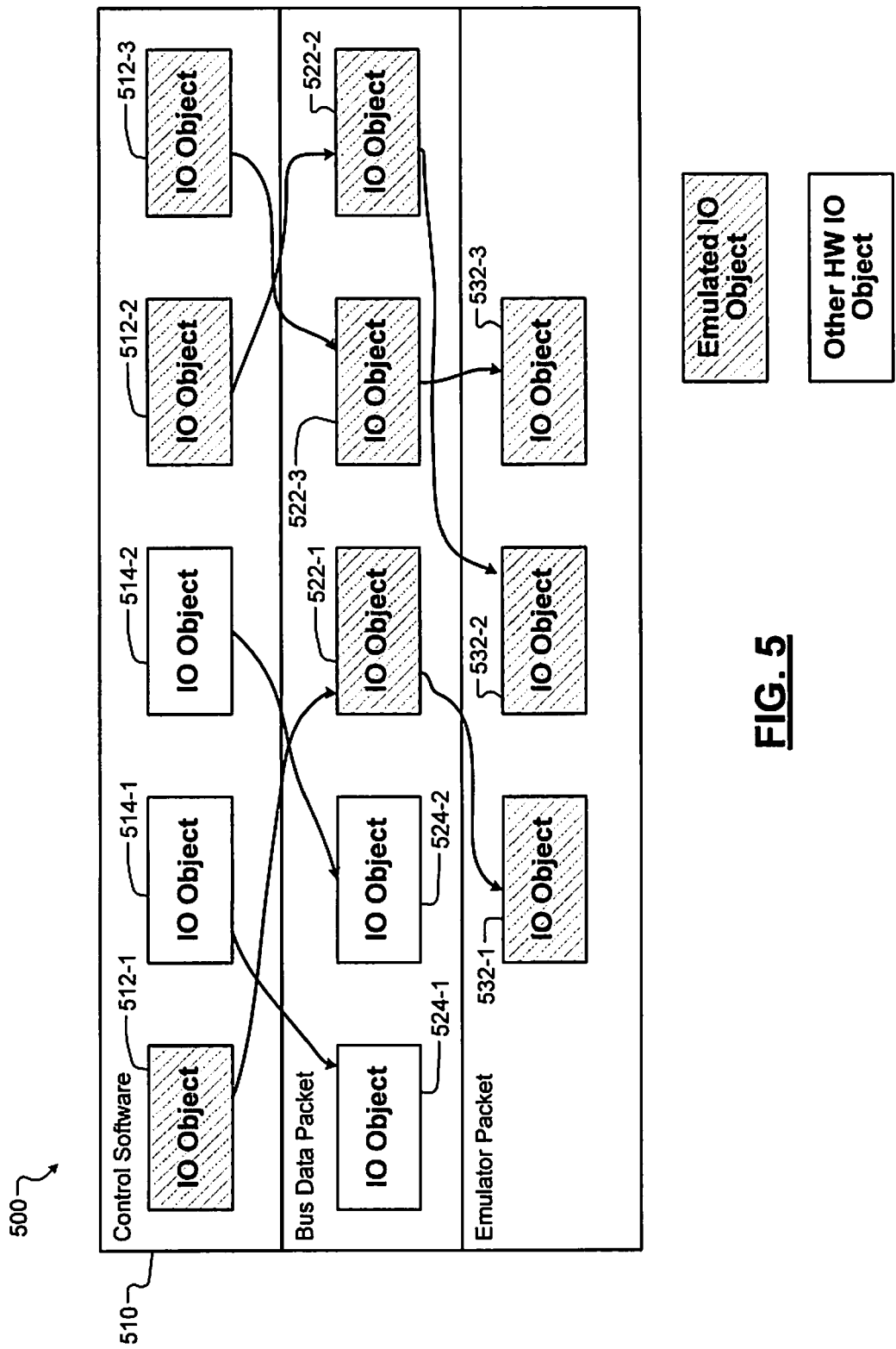
FIG. 5 illustrates an example of an I/O bus adapter with an emulator extension or software switch according to the present disclosure.

Referring now to FIG. 5, operation of the I/O bus adapter 324 with an emulator extension is shown. The I/O bus adapter 324 prepares information for exchange with the hardware components or the software modules emulating the hardware components. For example, the process control application 510 transmits and receives a data stream including emulated I/O objects 512-1, 512-2, and 512-3 (collectively emulated I/O objects 512) and hardware I/O objects 514-1 and 514-2.

A subset of the data stream includes bus data packets 522-1, 522-2, and 522-3 to/from the emulated I/O objects 512-1, 512-2, and 512-3. The bus data packets 522-1, 522-2, and 522-3 are routed as emulator packets 532-1, 532-2, and 532-3 (collectively emulator packets 532) via the emulator bus 340. Another portion of the data stream from the process control application 510 includes bus data packets 524-1 and 524-2 from the hardware I/O objects 514-1 and 514-2. The bus data packets 524-1 and 524-2 are routed normally via the I/O bus 328 to the corresponding hardware component 332.

When the software emulation system is enabled, the software switch identifies and routes the subset of the data stream including the emulator packets to the emulator bus. The data packets include information for hardware components that are emulated. An emulator bus driver associated with the emulator bus 340 sends the emulator packets to the connected emulator.

The models emulate hardware components and interconnects in software. Each hardware component (such as an MFC, a valve, a gas delivery system, etc.) has an associated modeling class that defines behavior, responses, transfer functions and/or fault cases. The behavior of the model is function of time, model inputs, its capabilities and/or topology.

Figure 6:
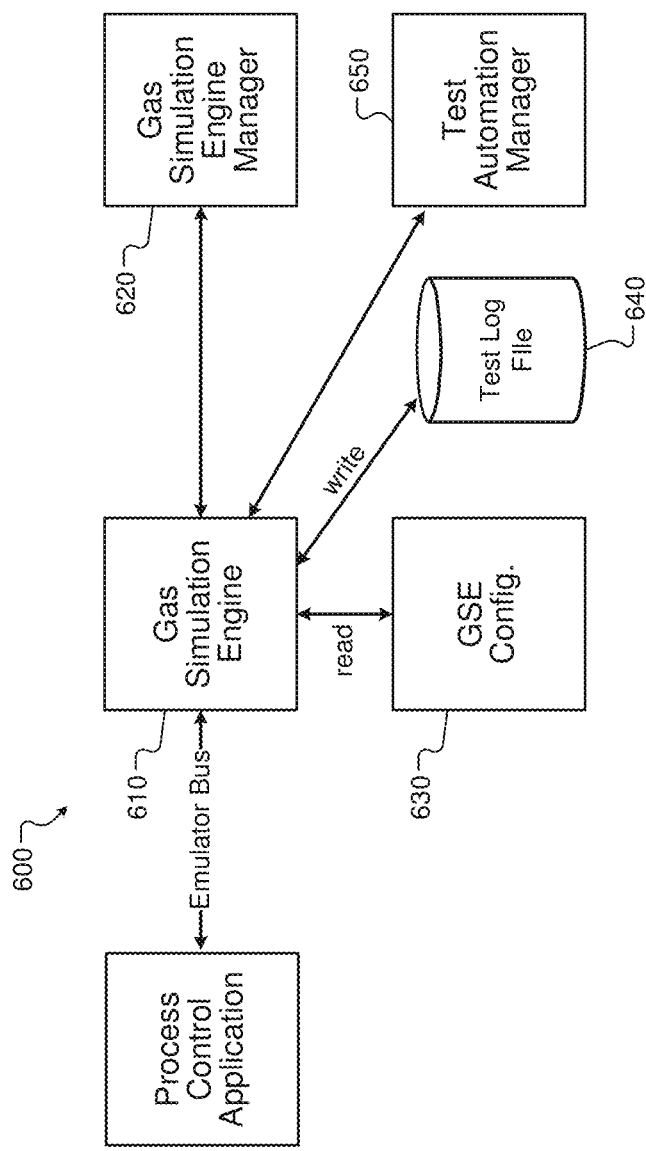
FIG. 6 is a functional block diagram of an example of a gas delivery system emulator according to the present disclosure.

A gas box emulator 600 is shown in FIG. 6. The gas box emulator 600 includes a gas simulation engine 610 that communicates with the control application via the emulator bus 340. The gas simulation engine 610 reads and is configured by a gas simulation engine configuration file 630.

The gas box emulator 600 further includes a gas simulation engine manager 620 that manages operation of the gas simulation engine 610. The gas box emulator 600 further includes a test automation manager 650 that allows test routines to be defined and run. Test routines emulates different hardware use cases, including faults cases that are executed while control software is running test procedures. The gas box emulator 600 writes data to a test log file 640 that stores data such as inputs, outputs, error codes, etc. during the tests.

Figure 7:
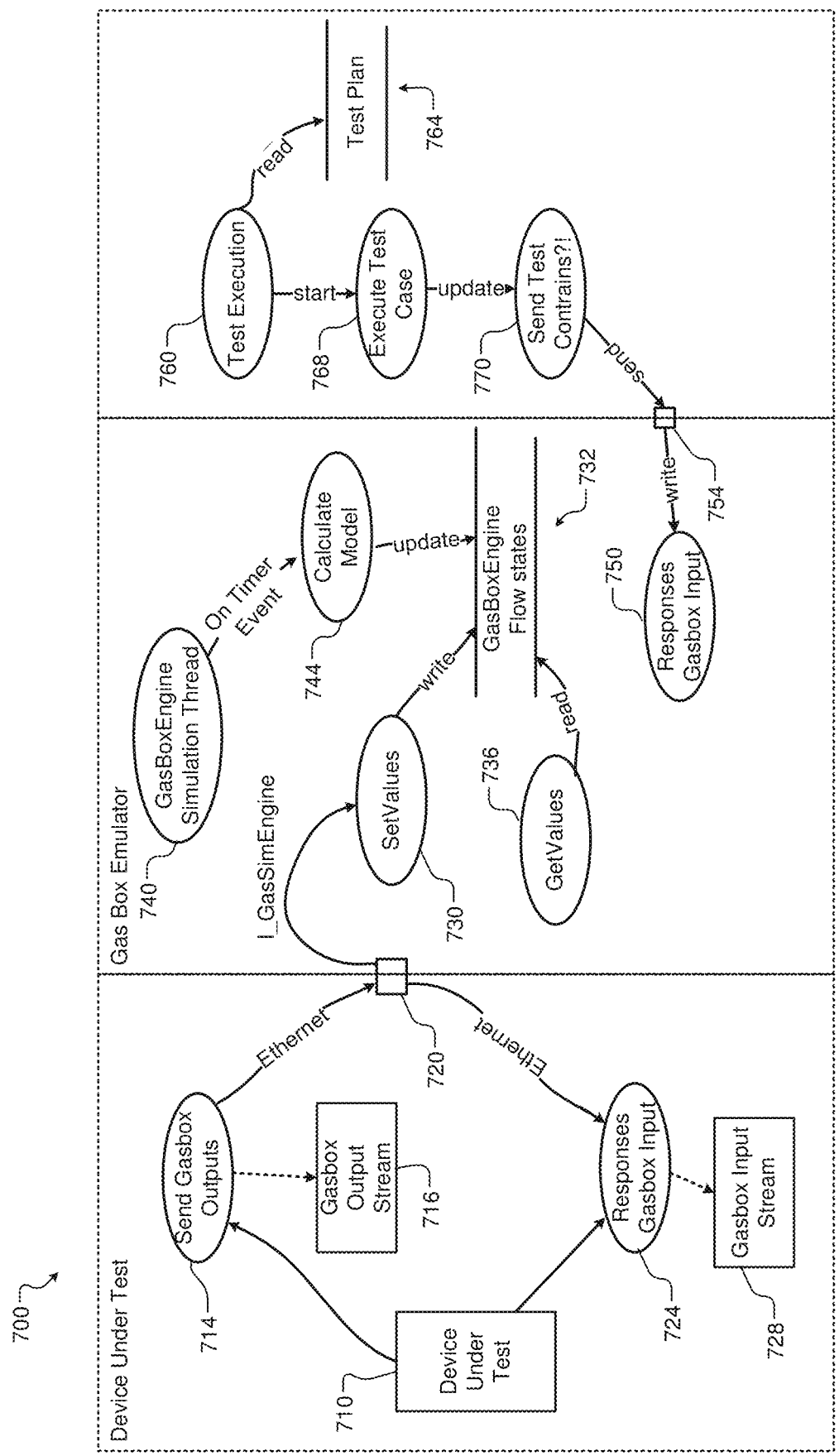
FIG. 7 is a model of an example of information flow during emulation of the gas delivery system according to the present disclosure.

Referring now to FIG. 7, information flow during gas emulation is shown. A device under test 710 (e.g., the process control application) transmits gas box outputs at 714, which creates a gas output data stream at 716. Responses to the gas box input are received at 724 via a gas box input stream 728. The gas box emulator writes set values at 730 to the gas box engine 732.

The gas box emulator calculates the models at 744 and provides updates to the gas box engine 732. In some examples, the gas box emulator reads values at 736 from the gas box engine 732 such as updates to flow states. The device under test 710 sends set values such as valve(ID, on or off state), MFC_SetPoint(id, set_value), etc. The device under test receives feedback such as MFC(id, actual_flow). Individual hardware components (MFC, valve, . . . ) are modeled independently.

In some examples, the test automation manager 650 uses test agents to test a normal operation mode (or best case) and one or more fault cases by changing the behavior of one or more emulated components in the gas simulation engine 610. For example, a valve that would normally open with a standard rise time can be programmed to open briefly after the rise time, then close and open multiple times quickly, and then open fully.

Figure 8:
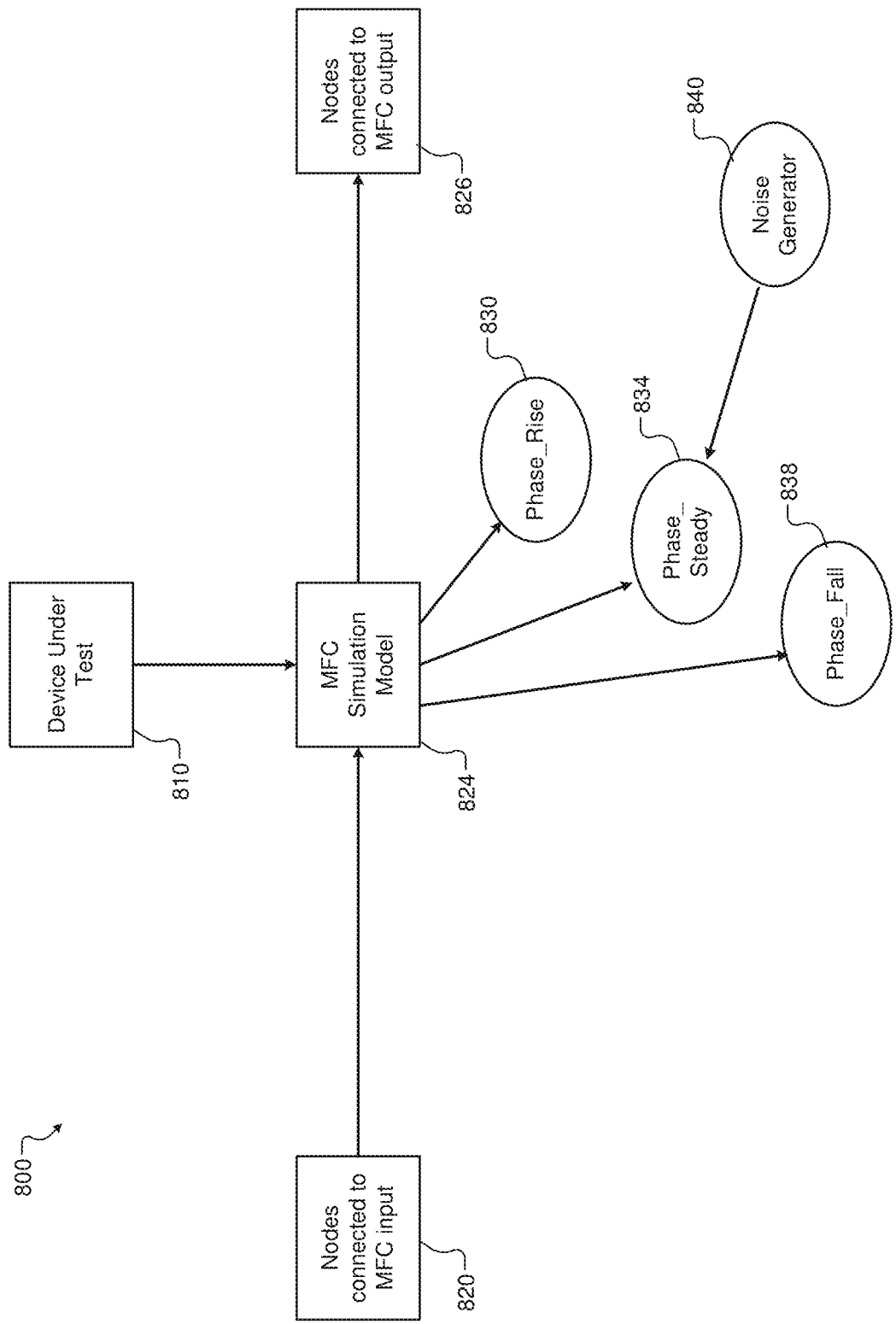
FIG. 8 is a functional block diagram of an example of a mass flow controller (MFC) emulator according to the present disclosure.

Referring now to FIG. 8, an example of a mass flow controller (MFC) model is shown. The MFC model is implemented by the MFC emulator module according to the present disclosure. The device under test 810 (the process control application) communicates with the MFC simulation model 824. The MFC simulation model 824 includes inputs 820 that are connected to one or more other hardware components or nodes. The MFC simulation model 824 includes outputs 826 that are connected to one or more other hardware components or nodes. In some examples, the MFC simulation model 824 implements first, second and third functions corresponding to phase rise at 830, phase steady at 834 and phase fall at 838. The MFC simulation model 824 may include a noise generator 840 that adds a noise input to the phase steady function 834. Each hardware component in the emulated gas box can have a unique simulation model, which emulates hardware as detailed as required. The number of simulation model inputs and sources are not limited.

In some examples, the MFC model is set equal to f_out=func(f_in, parameters). func( ) is a function that is changed based on input parameters. The func( ) is set equal to F_rising( ) when f_output is less than f_set_point by a predetermined amount. The func( ) is set equal to F_steady( ) when f_output is within a predetermined range of f_set_point. The func( ) is set to F_falling( ) when f_output is greater than f_set_point by a predetermined amount. In some examples, noise is induced in steady state conditions.

In some examples, parameters of the model can be set and changed by the test agent. In some examples, the parameters that can be set and changed include a shape of the rising portion, a shape of the falling portion and noise levels during steady state conditions.

The software emulation system according to the present disclosure solves many of the problems associated with hardware dependent software validation. For example, the software emulation system eliminates the software simulation and hardware test stand. In addition, the software emulation system performs new test procedures for the hardware components without requiring changes to the process control application. The software emulation system provides improved code test coverage at no additional cost. The software emulation system emulates hardware components for a substrate processing system in real-time and provides responses as if the real hardware was present.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In some implementations, a controller is part of a system, which may be part of the above-described examples. Such systems can comprise semiconductor processing equipment, including a processing tool or tools, chamber or chambers, a platform or platforms for processing, and/or specific processing components (a wafer pedestal, a gas flow system, etc.). These systems may be integrated with electronics for controlling their operation before, during, and after processing of a semiconductor wafer or substrate. The electronics may be referred to as the "controller," which may control various components or subparts of the system or systems. The controller, depending on the processing requirements and/or the type of system, may be programmed to control any of the processes disclosed herein, including the delivery of processing gases, temperature settings (e.g., heating and/or cooling), pressure settings, vacuum settings, power settings, radio frequency (RF) generator settings, RF matching circuit settings, frequency settings, flow rate settings, fluid delivery settings, positional and operation settings, wafer transfers into and out of a tool and other transfer tools and/or load locks connected to or interfaced with a specific system.

Broadly speaking, the controller may be defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a particular process on or for a semiconductor wafer or to a system. The operational parameters may, in some embodiments, be part of a recipe defined by process engineers to accomplish one or more processing steps during the fabrication of one or more layers, materials, metals, oxides, silicon, silicon dioxide, surfaces, circuits, and/or dies of a wafer.

The controller, in some implementations, may be a part of or coupled to a computer that is integrated with the system, coupled to the system, otherwise networked to the system, or a combination thereof. For example, the controller may be in the "cloud" or all or a part of a fab host computer system, which can allow for remote access of the wafer processing. The computer may enable remote access to the system to monitor current progress of fabrication operations, examine a history of past fabrication operations, examine trends or performance metrics from a plurality of fabrication operations, to change parameters of current processing, to set processing steps to follow a current processing, or to start a new process. In some examples, a remote computer (e.g. a server) can provide process recipes to a system over a network, which may include a local network or the Internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed and the type of tool that the controller is configured to interface with or control. Thus as described above, the controller may be distributed, such as by comprising one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the chamber.

Without limitation, example systems may include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that may be associated or used in the fabrication and/or manufacturing of semiconductor wafers.

As noted above, depending on the process step or steps to be performed by the tool, the controller might communicate with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

What is claimed is:

1. A software emulation system for a gas delivery system of a substrate processing system, comprising:
   an input/output bus;
   an emulator bus;
   an input/output bus adapter including a switch configured to route data packets from a system controller for the substrate processing system to one of the input/output bus and the emulator bus; and
   a gas delivery system emulator in communication with the emulator bus and configured to:
      receive the data packets from the input/output bus adapter via the emulator bus; and
      perform software-based emulation of a plurality of hardware components of the gas delivery system that are interconnected,
   wherein
      the plurality of hardware components are modelled by the gas delivery system emulator using one or more software models and include a gas source and a mass flow controller,
      at least one of the one or more software models includes a mass flow controller model, and
      the mass flow controller model
         simulates the mass flow controller including generation of an output function, wherein the output function comprises a selected one of a rising function, a steady function and a falling function, which are available selectable functions for the output function and have corresponding respectively generated output flow rates, and
         based on a comparison of a current output flow rate and a flow rate setpoint, selects the one of the rising function, steady function and falling function.

2. The software emulation system of claim 1, wherein the gas delivery system emulator includes a gas simulation engine to perform emulation using the one or more software models, configuration data defining the plurality of hardware components and a netlist defining connections between the plurality of hardware components.

3. The software emulation system of claim 2, wherein the gas delivery system emulator includes a gas simulation engine manager to manage the gas simulation engine.

4. The software emulation system of claim 3, wherein the gas simulation engine manager interfaces with a process control application of the system controller and generates the configuration data and the netlist.

5. The software emulation system of claim 2, wherein the gas simulation engine selectively generates a test log file.

6. The software emulation system of claim 2, wherein emulation performed by the gas delivery system emulator is performed without altering operation or coding of the system controller.

7. The software emulation system of claim 1, wherein the mass flow controller model uses a first function when the current output flow rate is within a predetermined range around the flow rate setpoint, a second function when the current output flow rate is less than the predetermined range and a third function when the current output flow rate is greater than the predetermined range.

8. The software emulation system of claim 7, wherein the mass flow controller model includes a noise generator to selectively add noise when the first function is operative.

9. The software emulation system of claim 1, wherein at least one of the one or more software models includes a normal emulation mode and at least one failure emulation mode.

10. A method for testing a gas delivery system of a substrate processing system, comprising:
   routing data packets received from a system controller for the substrate processing system to one of an input/output bus and an emulator bus;
   receiving the data packets from the emulator bus and performing software-based emulation of a plurality of hardware components of the gas delivery system that are interconnected; and
   modelling the plurality of hardware components using one or more software models,
   wherein
      the plurality of hardware components include a gas source and a mass flow controller,
      at least one of the one or more software models includes a mass flow controller model, and
      the mass flow controller model simulates the mass flow controller including generation of an output function, wherein the output function comprises a selected one of a rising function, a steady function and a falling function, which are available selectable functions for the output function and have corresponding respectively generated output flow rates, and
      based on a comparison of a current output flow rate and a flow rate setpoint, selects the one of the rising function, the steady function and the falling function.

11. The method of claim 10, further comprising performing emulation based on the one or more software models, configuration data defining the plurality of hardware components and a netlist defining connections between the plurality of hardware components.

12. The method of claim 11, further comprising interfacing with a process control application of the system controller to generate the configuration data and the netlist.

13. The method of claim 11, further comprising selectively generating a test log file.

14. The method of claim 11, further comprising performing the emulation without altering operation or coding of the system controller.

15. The method of claim 10, further comprising using a first function when the current output flow rate is within a predetermined range around the flow rate setpoint, a second function when the current output flow rate is below the predetermined range, and a third function when the current output flow rate is greater than the predetermined range.

16. The method of claim 15, further comprising using a noise generator to selectively add noise when the first function is operative.

17. The method of claim 10, wherein at least one of the one or more software models includes a normal emulation mode and at least one failure emulation mode.

18. The software emulation system of claim 1, wherein:
the gas delivery system emulator is configured to change the output function based on input parameters;
the input parameters comprise at least one of
a shape of the rising function;
a shape of the falling function; or
a noise level of the mass flow controller during a steady-state condition.

19. The software emulation system of claim 1, wherein:
the gas delivery system emulator is configured to change the output function based on input parameters; and
the input parameters comprise
a shape of the rising function;
a shape of the falling function; and
a noise level of the mass flow controller during a steady-state condition.

20. The software emulation system of claim 1, wherein the at least one of the one or more software models defines a worst case behavior.

21. The software emulation system of claim 1, wherein the rising function, the steady function and the falling function directly generate the respective output flow rates.

22. A software emulation system for a gas delivery system of a substrate processing system, comprising:
an input/output bus;
an emulator bus;
an input/output bus adapter including a switch configured to route data packets from a system controller for the substrate processing system to one of the input/output bus and the emulator bus; and
a gas delivery system emulator in communication with the emulator bus and configured to:
receive the data packets from the input/output bus adapter via the emulator bus; and
perform software-based emulation of a plurality of hardware components of the gas delivery system that are interconnected,
wherein
the plurality of hardware components are modelled by the gas delivery system emulator using one or more software models and include a gas source and a mass flow controller,
at least one of the one or more software models includes a mass flow controller model, and
the mass flow controller model simulates the mass flow controller and, based on a comparison of a current output flow rate and a flow rate setpoint, selects one of a plurality of output functions, which generate respective output flow rates,
the mass flow controller model uses a first function when the current output flow rate is within a predetermined range around the flow rate setpoint, a second function when the current output flow rate is less than the predetermined range and a third function when the current output flow rate is greater than the predetermined range,
the mass flow controller model includes a noise generator to selectively add noise when the first function is operative,
the noise is added to the first function while the first function is operative,
the added noise simulates noise experienced while operating in a steady state condition,
noise is not added to the second function while the second function is operative, and
noise is not added to the third function while the third function is operative.

23. The software emulation system of claim 1, wherein the mass flow controller model, based on a comparison of the current output flow rate and the flow rate setpoint, selects one of the rising function, steady function, and falling function and provides feedback to at least one of a valve or the plurality of hardware components to adjust the current output flow rate according to the selected one of the rising function, steady function and falling function.

24. The software emulation system of claim 1, wherein the output function is a configurable function and is configured based on function setting parameters, the function setting parameters are distinct from inputs to the output function.

25. The method of claim 10, wherein the mass flow controller model, based on a comparison of the current output flow rate and the flow rate setpoint, selects one of the rising function, steady function, and falling function and provides feedback to at least one of a valve or the plurality of hardware components to adjust the current output flow rate according to the selected one of the rising function, steady function and falling function.

26. The method of claim 10, wherein the output function is a configurable function and is configured based on function setting parameters, the function setting parameters are distinct from inputs to the output function.

* * * * *